METHOD FOR CONTROLLING PROPERTIES OF MAGNETIC FILM

Filed Dec. 4, 1968 2 Sheets-Sheet 1

INVENTORS
JOHN V. POWERS
LUBOMYR T. ROMANKIW

BY Maurice H. Klitzman

ATTORNEY

March 30, 1971 J. V. POWERS ET AL 3,573,193

METHOD FOR CONTROLLING PROPERTIES OF MAGNETIC FILM

Filed Dec. 4, 1968 2 Sheets-Sheet 2

United States Patent Office 3,573,193

Patented Mar. 30, 1971

3,573,193

METHOD FOR CONTROLLING PROPERTIES OF MAGNETIC FILM

John V. Powers, Shenorock, and Lubomyr T. Romankiw, Millwood, N.Y., assignors to International Business Machines Corporation, Armonk, N.Y.

Filed Dec. 4, 1968, Ser. No. 780,960
Int. Cl. C23f *17/00;* C23b *5/34*
U.S. Cl. 204—38 5 Claims

ABSTRACT OF THE DISCLOSURE

A method for controlling magnetic properties of magnetic films by controlling the roughness of the substrate surface onto which the magnetic film is deposited. On one hand the coercivity may be varied although the magnetic film thickness is being kept constant, on the other hand constant values of coercivity can be obtained even though the thickness of the magnetic film may vary. The substrate consists of a conductive ground plate coated with a thin layer of insulating material and thereafter copper plated. Prior to the deposition of the magnetic film, the copper surface is treated by electro pulse plating including reverse pulsing to obtain a well defined and controlled surface roughness.

BACKGROUND OF THE INVENTION

Field of the invention

The invention pertains to the manufacture of magnetic film devices of the kind as used in computer memories. More specifically, the invention pertains to a method of preparing magnetic thin film memories in which the value of the coercivity of the magnetic films is controlled.

Description of the prior art

Electronic circuitry associated with magnetic film storage in the past had to accommodate for considerable tolerances in coercivity of the magnetic films and therefore, circuitry had to be sophisticated and expensive. Also, in known magnetic film storages it seemed desirable to have the lowest possible controlled value of coercivity as this would cause a fairly low switching current for each storage place. To obtain such low coercivity values, the substrate surface was made as smooth as possible because coercivity, amongst other parameters, is known to depend upon smoothness of the substrate surface.

To prepare conductive non-magnetic substrate surfaces at high smoothness, a method is known in the art of electroplating which is commonly referred to as "pulse plating." It is based on the recognition that particularly smooth surfaces can be obtained if the electric plating current is applied in a non-steady form, i.e. in pulses, as described in the co-pending application Ser. No. 573,417 by J. M. Brownlow, filed on Aug. 18, 1966, now U. S. Pat. No. 3,480,522. The method of that application does not provide, however, for a magnetic film having a precise and reproducible coercivity at a given film thickness.

SUMMARY OF THE INVENTION

The subject method for controlling magnetic properties of magnetic films, said properties being independent of film thickness and composition, comprises the steps of immersing a non-magnetic metallic substrate in an electroplating bath, applying a series of current pulses of predetermined amplitude and duration through the bath of a polarity to deposit additional material upon the substrate, thus smoothing its surface, and reversing the current flow of pulses thus roughening up the surface to a certain degree and thereafter depositing a magnetic film onto the non-magnetic substrate. Magnetic memory elements prepared in this manner exhibit favorable characteristics due to uniform properties for all storage places.

OBJECT OF THE INVENTION

Accordingly, it is one object of this invention to produce a magnetic film storage of a well controlled value of coercivity that can be reproduced in other storage devices of the same kind at low tolerances.

Another object of the invention is to simplify the associated electronic circuitry in an improved manner for write in and read out by providing uniform signal levels due to uniform coercivity values.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

The following description pertains to the method of making a film as it may be used in a storage type known as "coupled film storage." This may find application as a main store in a large scale electronic computer.

Figure 1:
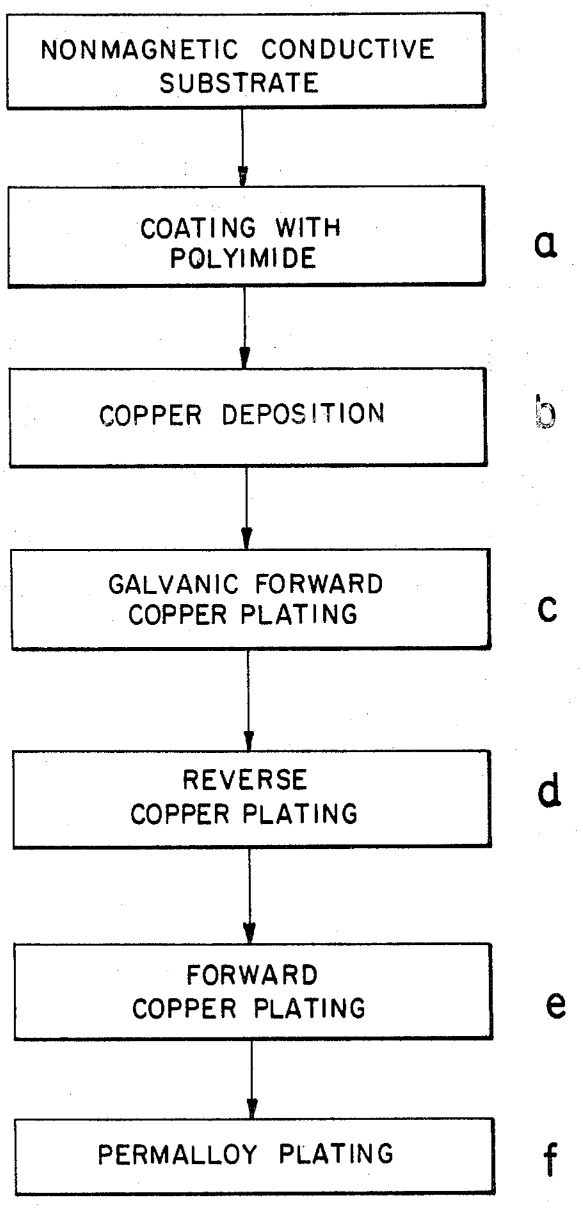
FIG. 1 is a flow diagram of the inventive process.

With reference to FIG. 1, the method of making the basic structure of the storage device includes covering a conductive plate of Phosphor bronze with an insulating layer of polyimide as depicted in step (a). A copper layer of 200–600 A. is then vacuum deposited onto the polyimide in step (b). In step (c), additional copper is deposited by means of electropulse plating, thus producing a very smooth surface. In step (d), the plating pulse current is reversed to roughen up the surface and in step (e) the current is reversed again to obtain a surface of well defined roughness. Finally, the magnetic permalloy film is plated onto the copper substrate in step (f).

It is understood, however, that other materials may be used instead of those mentioned. Thus, any conductive material may serve as a ground plate instead of Phosphor bronze. Semiconductors like silicon, for example, might be used. The insulating layer may be made by using other plastics, glass or still other insulating materials. The copper may be substituted by silver or any material capable of being electroplated. Although vacuum depositing the copper is preferred any other known method of plating could be used. Furthermore, a magnetic layer other than permalloy may be deposited by any suitable method. To provide further planes, the same process can be repeated. Finally, the magnetic film does not have to be arranged in a geometric plane but can be in a cylindrical surface, e.g. of a wire or any other suitable geometry. It has been mentioned above that the surface quality of the substrate supporting the magnetic layer is of considerable influence for the magnetic properties of the storage layer. While in the following description, the surface quality will be referred to as "roughness" or "smoothness," the technical phenomenon or theory involved is not entirely understood or the causes responsible for the magnetic properties of the overlaying magnetic film which results in the surface quality achieved. The change in surface crystal structure and possibly other phenomena may contribute to the results achieved. It is essential, however, that the method yields well controllable and reproducible results.

As mentioned previously, the copper layer which has been vacuum deposited on the insulating polyimide film is subjected to an electroplating process. The electroplating may be done in a dilute acid bath, for example, as disclosed in the co-pending application Ser. No. 737,350 by Alberts, Brownlow and Grebe, filed June 17, 1968, now U.S. Patent No. 3,520,784, and assigned to same assignee as is this application. This bath contains water, a water soluble copper salt, a source of sulfate ions, a source of nitrate ions, titanic acid, gelatine and a surfactant. The ratio of nitrate ions to sulfate ions in the bath is maintained in a range from about 0.3 to about 10.0.

A preferred bath for carrying out the inventive method consists of an aqueous solution of 10 g./l. $CuSO_45H_2O$; of 7 g./l. NaK tartrate; of 1.0 g./l. Na saccharin; of 1.0 g./l. sulfamic acid; of 4.5 ml./l. sulfuric acid (conc.) and of 0.6 g./l. Triton×100 (alkyl phenoxy polyethoxy ethanol), a surfactant prepared by Rohm & Haas Company.

The substrate consisting of a Phosphor bronze ground plate covered with an insulating layer of polymide on which at least 200 A. of copper have been plated in an electroless process is immersed into the electroplating bath and subjected to 1 or more plating pulses of a polarity to deposit farther copper onto the substrate. These pulses, also called forward pulses, are of an amplitude between 2 and 7 ma./cm.$^2$ with 5 ma./cm.$^2$ being a preferred value. The pulse duration is between 1 and 20 seconds and there is a pause of at least 10 seconds between subsequent pulses. These pulses provide a very smooth substrate surface and the smoothness increases by addition of further pulses which will deposit further material. Preferably 3 or more pulses are applied which will add 200 A. or more to the thickness of the copper layer.

In a subsequent step reverse plating pulses are applied which are of a polarity to remove material from the substrate surface. 1 or more pulses might be used of a duration and amptitude similar to the one of the former plating pulses. These pulses tend to roughen up the surface.

In a third process step 1 or more forward plating pulses, in turn, are applied which serve to obtain a well defined surface roughness by restoring some of the smoothness that has been produced by the first series of forward plating pulses.

Upon completion of the copper plating and smoothing the substrate is removed from the bath, thoroughly rinsed with a jet of deionized water and wiped, and thereupon plated with permalloy. The permalloy plating may be done in accordance with the method described in the pending application, Ser. No. 573,417, now U.S. Patent 3,480,522, by J. M. Brownlow, filed on Aug. 18, 1966. The method of that application produces a permalloy layer of electropulse plating from a relatively dilute bath including Ni, Fe and Cu ions. Other methods, however, may be used.

Figure 2:
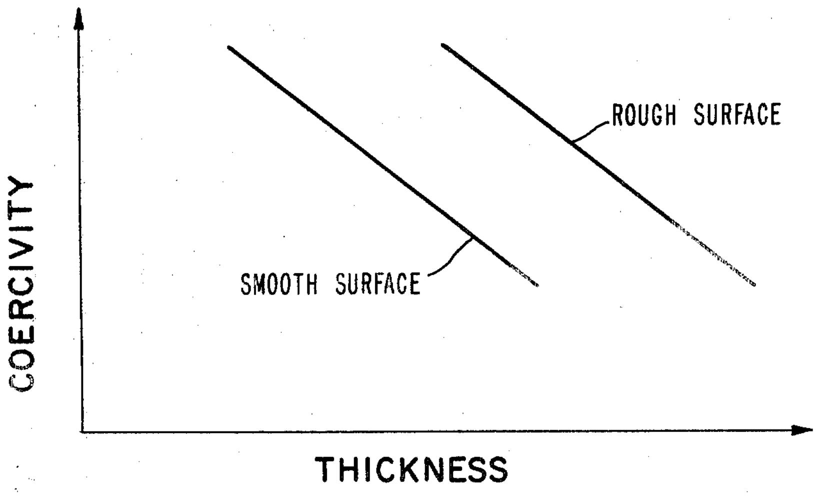
FIG. 2 is a diagram depicting the relationship between substrate surface roughness, coercivity and film thickness.
Figure 3:
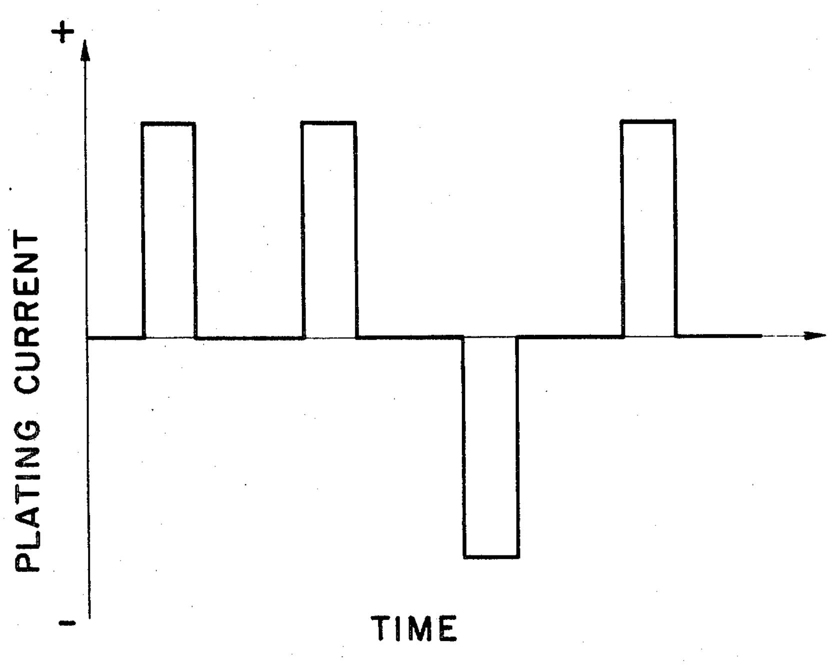
FIG. 3 shows a plot of the plating current versus time.

FIG. 2 shows the inter-relation of the thickness of the magnetic permalloy film, the coercivity of the film and the surface quality of the underlying substrate. It is apparent that for a given film thickness the coercivity of the film may be varied by putting a film on a relatively rough or on a relatively smooth surface. It should be remembered that the terms "rough" and "smooth" concern the quality of the substrate surface in a wide sense. The thickness scale of the graph is logarithmically divided to have the groups appear as straight lines. It has been found that the substrate surface inasmuch as it influences the coercivity of the magnetic layer can be very well controlled by selecting an appropriate sequence of pulses for the electroplating current. In one example, the current pulse sequence follows the curve plotted in FIG. 3 i.e. there are 2 positive pulses, 1 negative pulse and 1 more positive pulse all of about 5 ma./cm.$^2$ amplitude and of 15 seconds duration with 30 seconds interruption in between pulses. If another value of coercivity of the magnetic film is desired and if all other parameters remain unchanged, it is sufficient to change the sequence, amplitude or duration of plating pulses. The number of pulses in each direction can be 1 or more or the second series of forward pulses can be omitted.

In the following, some examples of a preferred embodiment are given and obtained values are indicated.

Example 1.—4 forward plating pulses, 1 reverse pulse and 1 forward plating pulse all of 5 ma./cm.$^2$ are applied and a permalloy film of 1300 A. is plated onto the substrate, so obtained. The coercivity $H_e$ is 3.2 Oe., the anisotropy $H_k$=5.5 Oe. and the dispersion $\alpha_{90}$ is 1.0.

Example 2.—To obtain the same coercivity with a film of 1000 A. only, 4 forward plating pulses only applied. This film only differs slightly in the dispersion which is $\alpha_{90}=0.5°$.

Example 3.—6 forward plating pulses applied and 1 reverse pulse all of 5 ma./cm.$^2$. 1500 A. of permalloy are then plated upon the substrate so obtained and the coercivity resulting is $H_c$=5.2 Oe., the anisotropy $H_k$=6.0 Oe., the dispersion $\alpha_{90}=2.0°$.

Example 4.—8 forward plating pulses and 3 reverse pulses, all of 5 ma./cm.$^2$ are applied. 2500 A. of permalloy are plated and the coercivity obtained is $H_c$=3.0 Oe., the anisotropy $H_k$ is 7.0 Oe., the dispersion $\alpha_{90}$ is 3.0°.

It is to be observed that for the last example as well as for the following one the thickness of the permalloy film should be reduced to the value of the before mentioned Example 3 by means of a set of curves like shown in FIG. 2. This would make clear that for equal film thickness varying values of coercivity can be obtained by the inventive method.

Example 5.—6 forward plating pulses of 5 ma./cm.$^2$, 1 reverse pulse of 5.7 ma./cm.$^2$ and 1 more forward pulse of 5 ma./cm.$^2$ are applied. Onto the resulting substrate 5000 A. of permalloy are plated. The value of coercivity $H_e$=2.2 Oe., the anisotropy $H_k$=1.4 Oe. and the dispersion $\alpha_{90}=3.0°$.

The magnetic layers used in these examples consist of permalloy of about 80/20 Ni/Fe composition, i.e. the composition of about zero-magnetostriction. A second copper layer about 5 microns thick may be plated on top of the magnetic film and this, in turn, is treated by the method of electric pulse plating described above as it will support a second magnetic layer. Word lines as well as bit lines will be arranged by way of etching or any other known suitable method to complete the memory. A memory plate in the order of about 10 x 10 centimeters may contain about $10^5$ bits of binary storage. Still larger storage plates are possible. The plates may be stacked on top of each other to constitute very big storages for use in large electronic computers.

While the invention has been particularly shown and described with reference to a preferred embodiment thereof, it will be understood by those skilled in the art that the foregoing and other changes in material, form and details may be made therein without departing from the spirit and scope of the invention.

What is claimed is:

1. A method of controlling magnetic properties of magnetic films, comprising the steps of:
   (a) immersing a polyimide coated Phosphor bronze substrate having a non-magnetic material coating into a dilute acid electroplating bath,
   (b) depositing additional non-magnetic material on said non-magnetic material coating by applying through said bath at least one electric current pulse of predetermined amplitude, duration and polarity,
   (c) partially removing said non-magnetic material from said substrate by applying through said bath at least one electric current pulse of predetermined amplitude, duration and polarity, and
   (d) depositing permalloy onto the said substrate surface, where said non-magnetic material is selected from the group consisting of copper and silver.

2. A method according to claim 1 wherein step (c) is followed by an additional step of depositing non-magnetic material on said substrate by applying through said bath at least one electric current pulse of predetermined amplitude duration and polarity.

3. A method according to claim 1 wherein the duration of said plating pulses is between 1 and 20 seconds and the pause in between subsequent pulses is longer than 10 seconds.

4. A method according to claim 1 wherein the amplitude of the pulses for plating additional non-magnetic materials as well as for removing non-magnetic material is between 2 and 7 ma./cm.$^2$.

5. A method according to claim 1 wherein said electroplating bath consists of an aqueous solution of:

$CoSO_4$–$5H_2O$—10 grams per liter
NaK-tartrate—7.5 grams per liter
Na-saccharin—1.0 grams per liter
Sulfamic acid—1.0 grams per liter Sulfuric acid (conc.)—4.5 milliliter per liter
Alkyl phenoxy polyethoxy ethanol—0.6 grams per liter

References Cited

UNITED STATES PATENTS

| | | | |
|---|---|---|---|
| 2,951,978 | 9/1960 | Dickson et al. ______ | 204—44X |
| 3,267,007 | 8/1966 | Sloan ______________ | 204—38X |
| 3,433,721 | 3/1969 | Wolf _______________ | 204—38X |

DANIEL E. WYMAN, Primary Examiner

C. F. DEES, Assistant Examiner

U.S. Cl. X.R.

204—35, 44, 52

PO-1050
(5/69)

UNITED STATES PATENT OFFICE
CERTIFICATE OF CORRECTION

Patent No. 3,573,193 (780,960) Dated March 30, 1971

Inventor(s) J. V. POWERS ET AL

It is certified that error appears in the above-identified patent and that said Letters Patent are hereby corrected as shown below:

Column 4, line 6 "$H_e$" should read --$H_c$--.

line 7 "1.0" should read --1.0°--.

line 32 "$H_e$" should read --$H_c$--.

Column 5, line 12, "$CoSO_4$-$5H_2O$" should read --$CuSO_4 \cdot$ 5I

Signed and sealed this 9th day of May 1972.

(SEAL)
Attest:

EDWARD M.FLETCHER,JR.
Attesting Officer

ROBERT GOTTSCHALK
Commissioner of Patents